United States Patent

[11] 3,604,216

| | | |
|---|---|---|
| [72] | Inventor | James M. Porter<br>La Crosse, Wis. |
| [21] | Appl. No. | 856,274 |
| [22] | Filed | Sept. 9, 1969 |
| [45] | Patented | Sept. 14, 1971 |
| [73] | Assignee | The Trane Company<br>La Crosse, Wis. |

[54] CRYSTALLIZATION PREVENTION CONTROL FOR ABSORPTION REFRIGERATION MACHINE
5 Claims, 4 Drawing Figs.

[52] U.S. Cl. .................................................. 62/141,
62/148, 62/476
[51] Int. Cl. ........................................................ F25b 15/06
[50] Field of Search ............................................. 62/141,
145, 476

[56] References Cited
UNITED STATES PATENTS
3,054,272 9/1962 Leonard, Jr. .................. 62/141 X
3,279,206 10/1966 Leonard, Jr. .................. 62/141
3,452,552 7/1969 Johnson ....................... 62/141

*Primary Examiner*—William F. O'Dea
*Assistant Examiner*—P. D. Ferguson
*Attorneys*—Arthur O. Andersen, Carl M. Lewis and Robert E. Lowe

ABSTRACT: A control switch senses impending crystallization in an absorption refrigeration machine to prevent solidification of absorption solution in critical areas of the machine. A sensing element senses a rise in the temperature of the concentrated absorption solution leaving the solution heat exchanger, which temperature rise is indicative of impending crystallization. This sensor can actuate a plurality of controls which will cause dilution of the concentrated solution in the heat exchanger or other crystallization prone areas. When the temperature of the concentrated solution leaving the solution heat exchanger falls below a predetermined level after decrystallization has occurred, additional automatic controls are actuated to initiate a dilution and shutdown cycle.

PATENTED SEP 14 1971 3,604,216

INVENTOR
JAMES M. PORTER

BY *[signature]*
ATTORNEY

INVENTOR
JAMES M. PORTER

BY
ATTORNEY

CRYSTALLIZATION PREVENTION CONTROL FOR ABSORPTION REFRIGERATION MACHINE

BACKGROUND OF THE INVENTION

This invention relates to an absorption refrigeration machine and more particularly to a means for preventing and decrystallizing sensitive areas of the absorption machine when a predetermined condition occurs.

During operation of an absorption refrigeration machine, the occurrence of accidents or malfunctions can cause solidification or crystallization of absorption solution in the flow passages of the machine. One of the most common sites for crystallization is in the concentrated solution passage of the solution heat exchanger. At this point the absorption solution has been concentrated by the generator and is being forced back to the absorber. Between the generator and the absorber the concentrated solution passes through the heat exchanger, releasing heat to dilute absorbent solution being pumped to the generator from the absorber. If for some reason the absorbent solution becomes too concentrated or is cooled below its crystallization temperature, the concentrated solution flow passage begins to block and eventually closes completely. This condition can occur over a period of very few minutes and has been known to occur in less than a minute.

A number of conditions can cause crystallization of the concentrated absorbent solution in the heat exchanger. For example, the presence of air or other inert gas in the absorber will prevent dilution of the absorbent solution therein. This will cause the concentration of the concentrated absorbent solution to rise. As the solution becomes supersaturated, it will begin to crystallize. If the condenser water suddenly becomes colder than normal operating temperature, a reduction in the temperature of the dilute absorbent solution leaving the absorber will result. This in turn will reduce the temperature of the concentrated absorbent solution in the heat exchanger below the crystallization point and will begin to block the heat exchanger. Overfiring the generator, resulting in supersaturation of the absorbent solution, will also cause crystallization blockage of the heat exchange passages.

It is desirable to prevent any of the above conditions from ever occurring. However, because of malfunction or accident it is impossible to prevent crystallization in the heat exchanger at all times. When crystallization and heat exchanger blockage occur, the only practical prior method of clearing the heat exchanger passages has been to heat them by an external heat source and liquify the absorbent solution therein. It is, therefore, most desirable to possess a means for sensing crystallization or impending crystallization and to clear heat exchanger passages before they become so completely blocked that external heat must be applied.

SUMMARY OF THE INVENTION

This invention, therefore, provides an absorption refrigeration machine including an absorber, an evaporator, a condenser, a generator, first conduit means for conducting concentrated solution from the generator to the absorber, second conduit means for conducting dilute solution from the absorber to the generator, and a heat exchange means for placing the second conduit means in heat exchange relationship with the first conduit means at a point between the generator and the absorber, the heat exchange means having a first flow passage comprising a portion of the first conduit means and a second flow passage comprising a portion of the second conduit means, the heat exchange means positioned below the generator, wherein the improvement comprises: control means for sensing a temperature representative of the exit temperature of concentrated solution from the first flow passage and for generating a control signal when the exit temperature exceeds a predetermined maximum, anticrystallization means for causing dilution of concentrated solution in the first flow passage in response to the control signal. In the preferred form of the invention refrigerant from the evaporator pan is dumped into the first flow passage means to dilute the partially crystallized solution therein.

DESCRIPTION OF THE PREFERRED EMBODIMENTS

Figure 1:
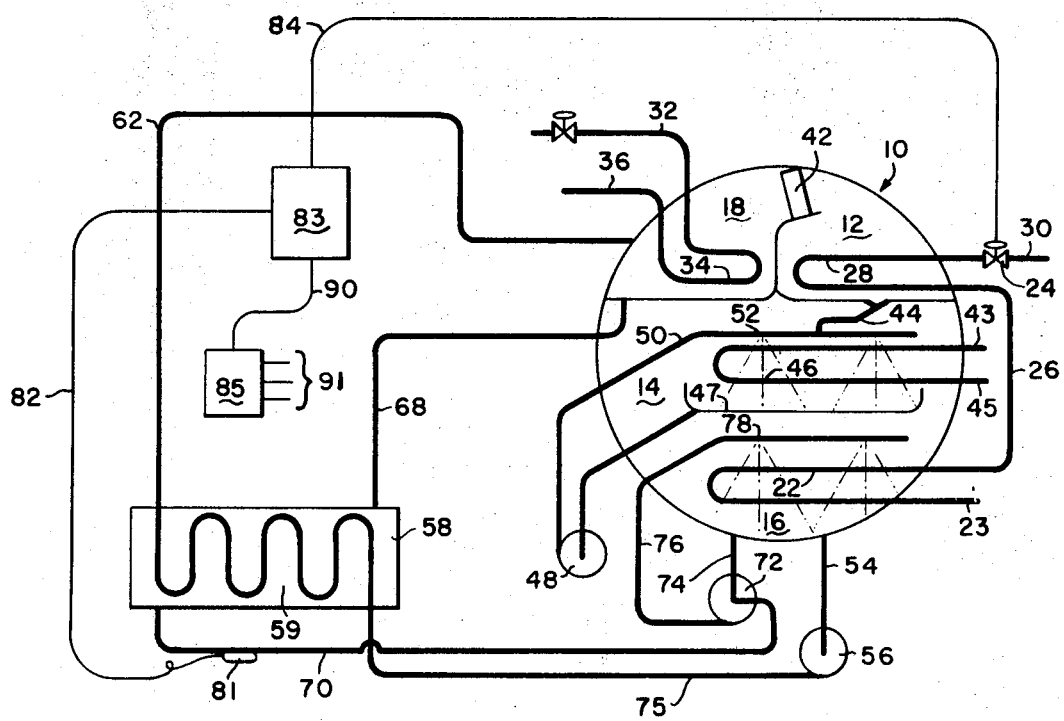
FIG. 1 is a schematic illustration of an absorption refrigeration machine employing an embodiment of the present invention. It illustrates a concentrated solution temperature control for modifying the flow of absorber and condenser cooling water.

Referring to FIG. 1, an absorption machine, enclosed by fluidtight shell 10, contains a condenser 12, an evaporator 14, an absorber 16, and a generator 18. The absorber 16 contains a heat exchanger 22 supplied with cooling fluid through a conduit 23 from a cooling tower (not shown) to remove heat from the absorber and condenser. This cooling fluid is conducted by a conduit 26 to heat exchanger 28 in condenser 12. The cooling fluid leaves the condenser through a conduit 30 and is returned to a cooling tower or other suitable source for cooling fluid. The flow of cooling fluid is modulated by valve 24 positioned in conduit 30.

Various suitable types of refrigerants and absorbents may be used in the present machine. A solution of lithium bromide absorbent in a refrigerant such as water is satisfactory. The term "concentrated solution" as used herein means a solution which is concentrated in absorbent. A "dilute solution" is one which is dilute in absorbent.

Steam flows from a source 32, such as a boiler, to a heat exchanger 34 in generator 18. Heat exchanger 34 is adapted to return steam condensate to the source of steam via conduit 36. It is, of course, understood that other suitable sources of heat can be used to concentrate absorbent solution in the generator 18. Heat from condensing steam in the generator heat exchanger 34 causes dilute solution in the generator to boil, thus producing refrigerant vapor and concentrating the absorbent solution.

The refrigerant vapor generated in the generator 18 flows through a liquid eliminator 42 into the condenser 12, in which the refrigerant is condensed to a liquid by heat exchange with the cooling fluid in heat exchanger 28. The liquid refrigerant flows from the condenser through orifice 44 into the evaporator 14.

A refrigerant liquid is vaporized in evaporator 14, thus removing heat from a chilled fluid being circulated through heat exchanger 46. The chilled fluid enters shell 10 through a conduit 43 and leaves through conduit 45. This chilled fluid is circulated to a heat load.

Since absorber section 16 is in vapor communication with the evaporator 14, the absorbent solution can absorb refrigerant vapor from the evaporator, thus removing heat from the evaporator section. Refrigerant liquid dropping from the heat exchanger 46 is collected by pan 47. It flows from the pan through a conduit 49 to a pump 48 which delivers the refrigerant liquid through a conduit 50 to be sprayed in evaporator 14 through nozzles 52.

Dilute solution from the absorber 16 flows through conduit 54, pump 56 and heat exchanger 58, in conduit 62 to the generator 18 in which it is concentrated. The concentrated solution from the generator 18 flows through conduit 68 into the heat exchanger 58, in which it transfers heat to the weak solution flowing from conduit 54. From the heat exchanger 58 the concentrated solution flows through a conduit 70 to pump 72, at which point it mixes with dilute solution flowing from the absorber 16 through conduit 74. The mixed solution is forced by pump 72 through conduit 76 and is discharged into the absorber 16 through spray nozzles 78. It is to be understood that all pumps are driven by suitable motors which, for simplicity, have not been shown.

During normal refrigerant operation of the absorption machine dilute absorbent solution is pumped from the absorber to the generator. As the solution becomes more concentrated it flows from the generator 18 into conduit 68, thence into heat exchange passage 59. Under typical equilibrium operating conditions the concentrated absorbent solution will transfer heat to the dilute absorbent solution from conduits 75. The concentrated absorbent solution will then flow from heat exchange passage 59 into conduit 70 at a temperature varying somewhat with load, but typically less than 145° F. However, when the concentrated solution flow passage 59 in heat exchanger 58 begins to clog or block due to crystallization of the solution, the exit temperature of the concentrated solution in conduit 70 will begin to rise. The temperature of the concentrated solution leaving heat exchange passage 59 can consequently be tapped to indicate impending blockage or complete crystallization of the heat exchanger. A temperature sensor 81 is positioned in operable relationship with conduit 70 to sense the temperature of solution flowing therein. The temperature sensed is transmitted along line 82 to control 83. The control 83 can be of any conventional temperature-responsive design, for example, a pneumatic or electromechanical relay.

In the embodiment of FIG. 1 the control 83 upon being actuated at a preselected temperature by a rising concentrated solution temperature in conduit 70, for example 145° F., will transmit a signal through control line 84. The control signal is received by normally open, automatic valve 24 which is responsive to such a signal. If the control 83 is pneumatic, it follows the valve 24 will be responsive to a pneumatic control signal. Therefore, as the heat exchange passage 59 begins to block due to crystallization the rising temperature in conduit 70 will cause control 83 to actuate valve 24 which in turn shuts off the flow in conduit 30. As the cooling water to the absorber and condenser is stopped, the heat generated by absorpitoion of refrigerant will be retained by the dilute absorbent solution being pumped through conduit 75 into heat exchanger 58. In addition, since refrigerant will not be condensed in condenser 12, further production of refrigerant in 18 is virtually halted. This will result in a lesser heat load placed on the heated concentrated solution still flowing through heat exchanger passage 59. It will resultantly allow the temperature of the partially crystallized absorbent solution to rise above crystallization temperature. As this occurs the absorbent crystals will go back into solution and passage 59 will again permit free flow of concentrated solution.

However, since crystallization is usually caused by some outside occurrence which must be corrected before proper normal operation of the machine can resume, this embodiment of the invention will also automatically shut down the absorption machine after the heat exchange passage 59 has been cleared. As the passage 59 clears the temperature of solution in conduit 70 will drop from its abnormally high point down to or below its normal operating temperature.

As the temperature of the concentrated solution falls below the previously preselected set point temperature, control 83 will again respond and send a second control signal through line 90. In the preferred form of the invention this control signal will initiate a dilution and shutdown cycle through control 85 and control lines 91. The dilution cycle normally includes shutting off the stem or other heat source to the heat exchanger 34 and stopping the cooling water flowing into the conduit 23. In addition, pumps 48, 72 and 56 will continue operation until the absorbent solution in the absorber reaches a concentration equal with that in the generator. At this point the absorbent solution will not crystallize when the machine cools down to ambient temperatures. When the absorbent solution in the generator has been diluted, pumps 48, 72 and 56 will be shut down. A typical dilution cycle is illustrated and described in U.S. Pat. No. 3,002,359.

Some form of alarm can also be incorporated into the anticrystallization control to warn an operator that the machine is beginning to or has shut down due to impending crystallization. Examples of the types 55 of alarm contemplated are a warning bell or an alarm light which are actuated either upon initial response of control 83 or upon initiation of the dilution cycle.

Figure 2:
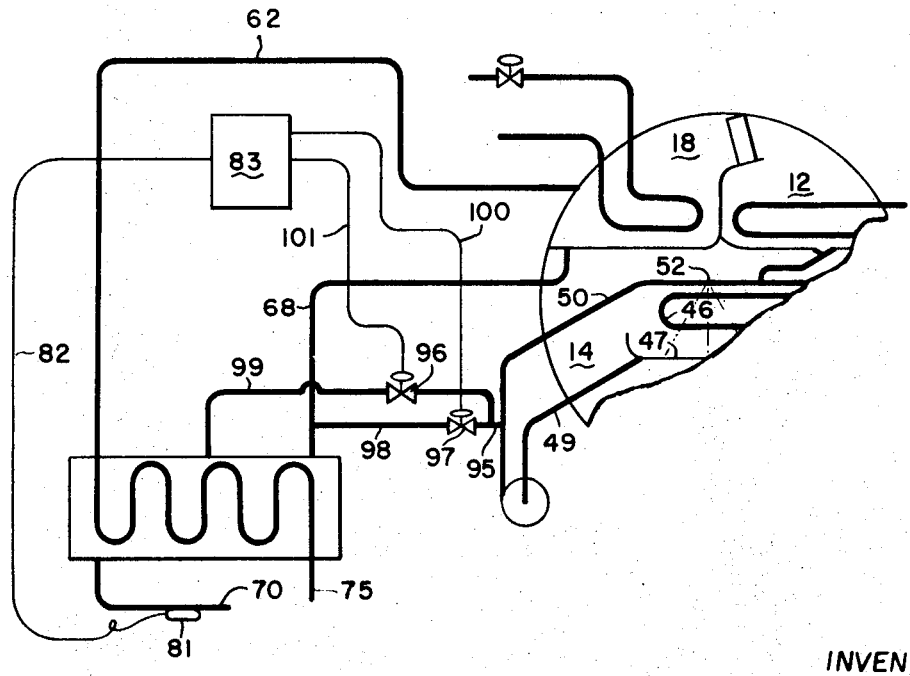
FIG. 2 is a schematic illustration of an absorption refrigeration machine employing the preferred embodiment of the anticrystallization control of the present invention. It illustrates a concentrated solution temperature control for dumping refrigerant into the heat exchanger.

The anticrystallization control illustrated in FIG. 2 is the preferred form of this invention. Where ever possible, for clarity and simplicity, numerals identical to those used in previous figures will be again utilized to indicate identical parts or operations of the machine. In this embodiment of my invention when the crystallization begins to occur, the concentrated solution temperature in conduit 70 again begins to rise. As the temperature rises above the preselected set temperature, typically 145° F., control 83 will be activated. A conduit 95 is connected to and is in fluid communication with conduit 50. Refrigerant not evaporated in evaporator 14 drops from the heat exchanger 46 and is collected in evaporator pan 47. This liquid refrigerant travels through conduit 49 into pump 48 and is conveyed through conduit 50 to spray headers 52 where it is again sprayed over heat exchanger 46. Conduit 95 is in fluid communication with normally closed valves 96 and 97. Valve 97 is in fluid communication on its downstream side with conduits 68 by means of conduit 98. Valve 96 is in fluid communication with the concentrated solution flow passage 59 of heat exchanger 58 via conduit 99. The flow in conduit means 98 and 99 is controlled by valves 97 and 96 respectively. These conduits can be used separately or together to accomplish the purpose of this invention.

When control 83 is activated by temperature sensor 81, a signal is transmitted through either one or both or control line 100 and 101. The optimum choice of which dumping point either conduit 68 or heat exchanger flow passage 59, depend upon a number of factors, including the specific design of a given absorption machine. If conduit 68 is chosen as the dumping point, the signal from control 86 will travel through line 100 and will open normally closed valve 97. As valve 97 is opened, refrigerant from the evaporator pan 47 will be pumped by pump 48 into conduit 68. Thus, the concentrated solution in conduit Refrigerant and eventually that in flow passage 59, will be diluted. The partially blocked heat exchange passages will be decrystallized and full flow therethrough can be resumed. If the heat exchange passage 59 is chosen as the point at which the refrigerant is dumped, a control signal will be transmitted through control line 101 to normally closed valve 96. Refrigerant will then be forced by pump 48 through conduits 95 and 99 into concentrated solution passage 59. The concentrated solution in passage 59 will be diluted and decrystallized, thus initiating unimpeded flow therethrough.

As mentioned above, upon decrystallization the temperature in conduit 70 will again drop below the preselected set point. As it does control 83 will be activated to send control signals through either or both of control lines 100 and 101 to close valves 97 and/or 96 respectively. In addition, the dilution and shutdown cycle can be initiated by control 83 at this time. Its operation has been explained in conjunction with FIG. 1.

Figure 3:
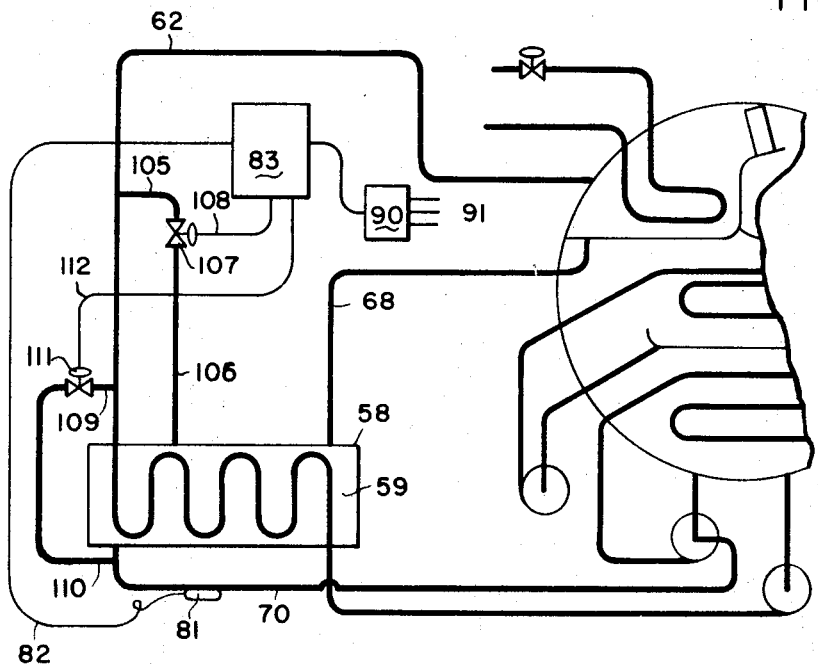
FIG. 3 is a schematic illustration of an absorption refrigeration machine employing another embodiment of the present invention. It illustrates a concentrated solution temperature control for dumping dilute absorbent solution into the heat exchanger.

Another embodiment of this invention is illustrated schematically in FIG. 3. The temperature sensor operates as before upon a rise in solution temperature in conduit 70. In this form of the invention dilute solution from conduit 62 is dumped into the passages in the conduits where crystallization occurs. Two dumping points are shown, both or either of which can be utilized to effect decrystallization, again depending upon a particular design of a given machine.

Conduit 105 is tapped into conduit 62. Normally closed valve 107 is connected to conduit 105 and to conduit 106, the latter of which is in fluid communication with heat exchange passage 59. As impending crystallization is sensed by temperature sensor 81, control 83 is actuated and transmits a signal through control line 108, opening normally closed valve 107. As valve 107 is opened, dilute solution from conduit 62 will be pumped into heat exchange passage 59, thus diluting the partially crystallized concentrated solution therein. As the concentrated solution is diluted it will decrystallize and normal flow through passage 59 can again resume.

Alternatively control 83 can transmit a signal through control line 112 to a normally closed valve 111. The upstream side of valve 111 is connected to conduit 62 by conduit 109. The downstream side of valve 111 is connected to the concentrated solution conduit 70 via conduit 110, thus allowing dilute solution to flow into conduit 70. As is evident, crystallization can occur not only in heat exchange passage 59, hut also in the concentrated solution conduit 70 which returns concentrated solution to the absorber from the heat exchanger 58. It is readily apparent that refrigerant can as well be dumped into conduit 70 and controlled as explained in conjunction with FIG. 2. Additionally, dilute solution from conduit 62, upon signal from control 83, can be dumped into concentrated solution conduit 68. However, for purposes of simplicity, this latter alternative has not been illustrated. Switching the machine to a shutdown and dilution cycle can be effected when the concentrated solution temperature drops below the preselected set point temperature. This again would be accomplished as explained in conjunction with FIG. 1.

Figure 4:
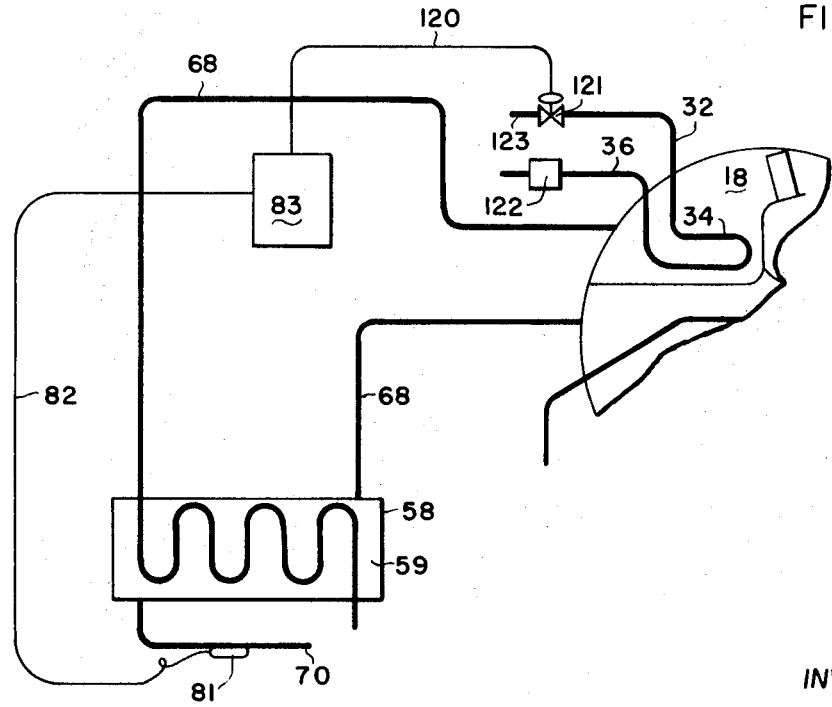
FIG. 4 is a schematic illustration of a portion of an absorption refrigeration machine employing still another embodiment of the present invention. It illustrates a concentrated solution temperature control for modifying heat input to the generator.

In the embodiment illustrated in FIG. 4, the heat exchanger 34 of generator 18 is supplied with a heated fluid through conduit 32 from a heat source 123, for example, a water boiler. The flow of heated fluid, for example steam, is controlled by valve 121. A suitable restrictor 122 can be placed in outlet conduit 36 for use when steam is the heat source. Restrictor 122 will allow steam condensate to pass back to the heat source, but will not allow steam to return. Again when crystallization begins to occur, the temperature of the concentrated solution in conduit 70 will rise to or above the predetermined set point temperature of control 83. The control will then transmit a signal through control line 120 to valve 121. Although valve 121 is a modulating valve which in the normal absorption refrigeration machine will be modulating the flow of heated fluid depending upon the refrigeration load placed upon the absorption machine, the signal in line 120 will override any modulating signal and cause valve 121 to close, thus preventing additional heating fluid from entering heat exchanger 34. This, in turn, will prevent further concentration of absorption solution in generator 18. The absorption solution in generator 18 will be diluted by the dilute solution flowing from the absorber into the generator through conduits 88. This solution will then flow into conduit 68 and into heat exchange passage 59 of the heat exchanger 58. The diluted solution will effect decrystallization of heat exchange passage 59 and restore normal flow therethrough. Again, as the temperature of concentrated solution in conduit 70 drops below the predetermined set point temperature, control 83 can be used to initiate the shutdown or dilution cycle as explained in conjunction with FIG. 1.

The control components utilized with the invention described above are of conventional manufacture. They can be, for example, electromechanically or pneumatically actuated.

Although the decrystallization control of this invention has been explained in conjunction with a single-stage generator absorption refrigeration machine, it can also be utilized with a two-stage generator absorption machine. In the two-stage machine crystallization will occur in the concentrated and low solution passages of the low-temperature heat exchanger. The low temperature heat exchanger is the one which is situated between the second stage, low-pressure generator an the absorber. It exchanges heat between the concentrated solution flowing to the absorber and the dilute solution flowing from the absorber. Temperature sensor 81 would be placed on the concentrated solution line to the absorber from the aforementioned heat exchanger.

An example of such a low-temperature heat exchanger is illustrated in the drawing of U.S. Pat. No. 3,287,928, reference numeral 26. The fluid control circuitry can easily be adapted by one of ordinary skill in the art from the preceding disclosure to an absorption machine having a two-stage generator and high and low temperature heat exchangers.

Therefore, what is claimed is:

1. An absorption refrigeration machine including an absorber, an evaporator, a condenser, a generator, first conduit means for conducting concentrated solution from said generator to said absorber, second conduit means for conducting dilute solution from said absorber to said generator, and a heat exchange means for placing said second conduit means in heat exchange relationship with said first conduit means at a point between said generator and said absorber, said heat exchange means having a first flow passage comprising a portion of said first conduit means and a second flow passage comprising a portion of said second conduit means, said heat exchange means positioned below said generator, the improvement comprising:
    control means for sensing the exit temperature of concentrated solution from said first flow passage, and for generating a control signal when said exit temperature exceeds a predetermined maximum and,
    anticrystallization means for adding refrigerant to said concentrated solution causing a dilution of concentrated solution in said first flow passage in response to said control signal.

2. The machine of claim 1 including a first heat exchanger in said evaporator, a collection pan positioned below said heat exchanger, first circuit means including said pan for recirculating refrigerant from said collection pan for distribution onto said first heat exchanger, the improvement further comprising:
    third conduit means for placing said first circuit means and said first flow passage in fluid communication,
    first valve means for controlling flow in said third conduit means responsive to said control signal, said first valve means being closed during a normal operational cycle of said machine.

3. The machine of claim 1 including a first heat exchanger in said evaporator, a collection pan positioned below said heat exchanger, first circuit means including said pan for recirculating refrigerant from said collection pan for distribution onto said first heat exchanger, the improvement further comprising:
    fourth conduit means for placing said first circuit means and said first conduit means between said generator and said heat exchange means in fluid communication,
    second valve means for controlling flow in said fourth conduit means responsive to said control signal, said second valve means normally closed.

4. The machine of claim 1, the improvement further comprising:
    fifth conduit means for placing said second conduit means between said generator and said heat exchange means in fluid communication with said first flow passage,
    third valve means for controlling flow in said fifth conduit means responsive to said control signal, said third valve means normally closed, said control means actuating this third valve means.

5. 5. The machine of claim 1, the improvement further comprising:
    sixth conduit means for placing said second conduit means between said generator and said heat exchange means in fluid communication with said first conduit means between said generator and said absorber,
fourth valve means for controlling flow in said sixth conduit means responsive to said control signal, said fourth valve means normally closed.